United States Patent [19]
Plichta et al.

[11] Patent Number: 5,273,847
[45] Date of Patent: Dec. 28, 1993

[54] SOLID STATE ELECTROLYTE FOR USE IN A HIGH TEMPERATURE RECHARGEABLE LITHIUM ELECTROCHEMICAL CELL AND HIGH TEMPERATURE RECHARGEABLE LITHIUM ELECTROCHEMICAL CELL INCLUDING THE SOLID STATE ELECTROLYTE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 5,691

[22] Filed: Jan. 19, 1993

[51] Int. Cl.$^5$ .................................. H01M 6/18
[52] U.S. Cl. ........................... 429/193; 429/218
[58] Field of Search ............... 429/193, 191, 218

[56] References Cited

U.S. PATENT DOCUMENTS

| | | | |
|---|---|---|---|
| 4,042,482 | 8/1977 | Shannon et al. | 429/191 X |
| 4,117,103 | 9/1978 | Hong | 429/193 X |

FOREIGN PATENT DOCUMENTS 57-085983  5/1982  Japan.

Primary Examiner—John S. Maples
Attorney, Agent, or Firm—Michael Zelenka; Roy E. Gordon

[57] ABSTRACT

A high temperature rechargeable solid state electrochemical cell is provided including an ion conducting solid having the formula $Li_{3.6}Ge_{0.6}V_{0.4}O_4$ as the electrolyte.

3 Claims, 2 Drawing Sheets

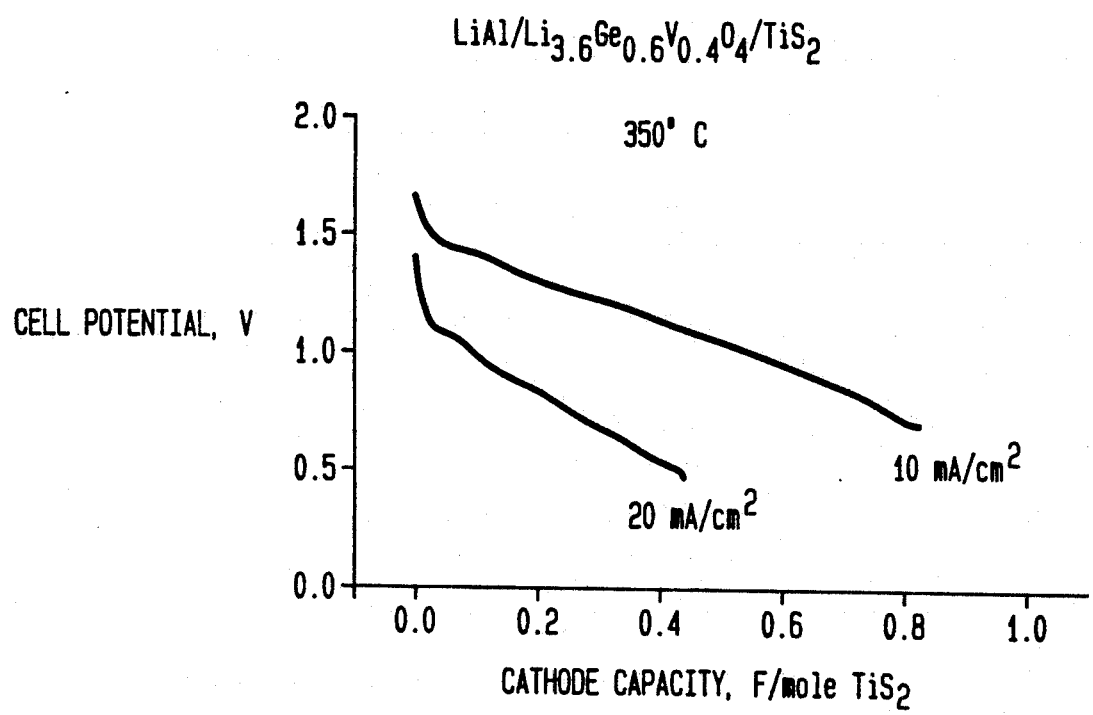

SOLID STATE ELECTROLYTE FOR USE IN A HIGH TEMPERATURE RECHARGEABLE LITHIUM ELECTROCHEMICAL CELL AND HIGH TEMPERATURE RECHARGEABLE LITHIUM ELECTROCHEMICAL CELL INCLUDING THE SOLID STATE ELECTROLYTE

GOVERNMENT INTEREST

The invention described herein may be manufactured, used, and licensed by or for the Government for governmental purposes without the payment to us of any royalties thereon.

BACKGROUND OF THE INVENTION

I. Field of the Invention

This invention relates in general to high temperature rechargeable lithium electrochemical cells and in particular to a high temperature rechargeable solid state lithium electrochemical cell operable at temperatures of about 300° C. to about 400° C.

II. Description of the Prior Art

High temperature rechargeable molten salt lithium electrochemical cells are required for electric propulsion, load leveling and pulse power applications. Amongst the many molten salt electrochemical systems that have been studied over the past many years, the lithium alloy/metal sulfide cells have shown considerable promise for these applications. These cells have used a lithium alloy (LiAl) as the anode, an electrolyte including a molten mixture of lithium halide, metal and alkali halides and a transition metal sulfide ($FeS_2$, $CoS_2$, $TiS_2$) as the cathode. The use of molten electrolytes, however, has introduced problems of sealing the cells as well as causing corrosion of cell components at the operating temperatures of about 400° C. to 500° C.

SUMMARY OF THE INVENTION

The general object of this invention is to provide a lithium rechargeable electrochemical cell that can be operated at high temperatures of about 300° to 400° C. A more particular object of the invention is to provide such a cell as a safe, rechargeable high energy density power source having excellent cycle life, component stability and low cost. Another object of the invention is to provide such a cell that can be used in a bipolar cell configuration as a low volume power source for electronic equipment, electric vehicle propulsion, robotics as well as general portable devices requiring a high power density cell.

It has now been found that the aforementioned objects can be attained by providing a rechargeable lithium solid state electrochemical system including a lithium ion conducting solid having the formula $Li_{3.6}Ge_{0.6}V_{0.4}O_4$ as the electrolyte. More particularly, the electrochemical system or cell of the invention includes a titanium disulfide cathode, a lithium-aluminum alloy anode, and a lithium ionically conductive solid as the electrolyte; the cell operating at elevated temperatures of about 300° to 400° C.

DESCRIPTION OF THE PREFERRED EMBODIMENT

The cathode is prepared by thin film deposition of $TiS_2$ onto an aluminum metal foil current collector in which the active material has a thickness of about 5 microns. The electrolyte is prepared by pressing a lithium ion conducting solid solution of $Li_4GeO_4$ and $Li_{3.6}Ge_{0.6}V_{0.4}O_4$, having the general chemical composition of $Li_{3.6}Ge_{0.6}V_{0.4}O_4$, into a ¼" diameter, 0.5 mm pellet. The anode is prepared either by pressing LiAl alloy (20 weight percent Li) alone or a mixture of 75 weight percent LiAl alloy and 25 weight percent $Li_{3.6}Ge_{0.6}V_{0.4}O_4$, into a ¼" diameter, 0.5 mm thick pellet. The cell is prepared by stacking the anode, electrolyte, and cathode successively to which compressive force is applied to the cell stack by use of a spring loaded jig. The cell stack is then sealed in a Pyrex glass vessel and continuously purged with argon gas while heating to a temperature high enough to allow for lithium ions to flow freely in the solid electrolyte at about 300° to 400° C.

DESCRIPTION OF THE DRAWING

FIG. 3 shows the high rate capabilities of the $LiAl/Li_{3.6}Ge_{0.6}V_{0.4}O_4/TiS_2$ cell at 350° C.

Referring to FIG. 1, the discharge current density is 1 mA/cm². The potential limits are between 2.7 volts and 0.7 volt. As is shown, full use of the $TiS_2$ cathode is observed according to the following lithium intercalation reaction:

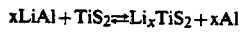

$$xLiAl + TiS_2 \rightleftharpoons Li_xTiS_2 + xAl$$

where x can be between 0 and 1 and corresponds to the cathode capacity.

Figure 1:
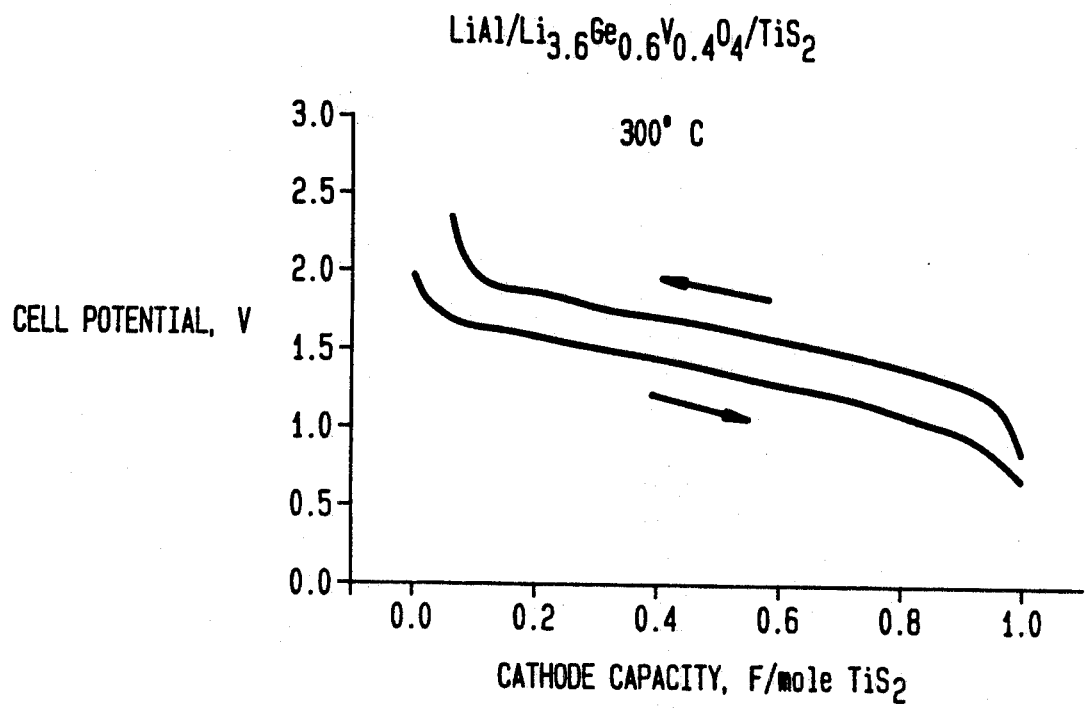
FIG. 1 shows the initial cycle of a $LiAl/Li_{3.6}Ge_{0.6}V_{0.4}O_4/TiS_2$ cell operating at 300° C.
Figure 2:
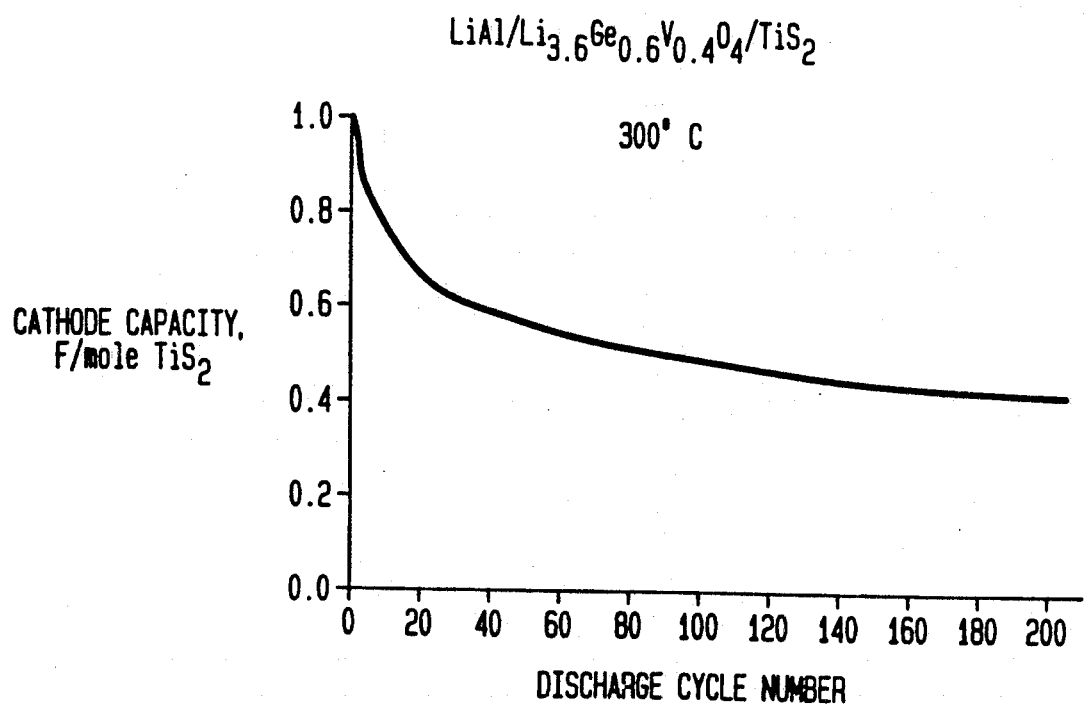
FIG. 2 shows the rechargeable behavior of the $LiAl/Li_{3.6}Ge_{0.6}V_{0.4}O_4/TiS_2$ cell that is cycled between 2.7 V and 0.7 V at 300° C.

Referring to FIG. 2, the discharge current density is 1 mA/cm² and the charge current density is 0.5 mA/cm². The theoretical energy density for the $LiAl/TiS_2$ cell is 422 wh/kg based upon an open circuit potential of 2.3 V.

Other cathode materials that can be substituted for $TiS_2$ include $FeS_2$, $CoS_2$, $NiS_2$, $LiCoO_2$, $LiNiO_2$, $LiMnO_2$, $V_6O_{13}$, $V_2O_5$, $MnO_2$ $Cr_3O_8$, $V_2S_5$, $MoS_2$, $MoS_3$, $Nb_2Se_3$, $VSe_2$, $AgF$, $CuF_2$, $V_6O_{13}$, $V_2O_5$, $Cr_3O_8$, $V_2S_5$, $MoS_2$, $MoS_3$, $NbSe_3$, $VSe_2$, $AgF$, $CuF_2$, $CuCl_2$, $CuCl$, $NiF_2$, as well as other transition metal halides, chalcogenides, selenides, tellurides, and oxides.

Other electrolyte compositions that can be substituted for $Li_{3.6}Ge_{0.6}V_{0.4}O_4$ include solid solutions of $Li_4GeO_4$—$Li_3VO_4$, $Li_{3.75}Si_{0.75}P_{0.25}O_4$, $Li_{3.4}Si_{0.7}S_{0.3}O_4$, $Li_{2.25}C_{0.75}B_{0.25}O_3$, and $Li_{14}ZnGe_4O_{16}$ as well as other lithium ion conducting solid state materials.

Other anode materials that can be substituted for LiAl include LiSi, LiB, $LiC_6$, $LiTiS_2$, $LiVSe_2$, as well as other lithium containing compounds suitable for use as an anode.

Referring to FIG. 3, use of this cell in a bipolar construction enables the development of a high power density battery suitable for pulse power applications.

We wish it to be understood that we do not desire to be limited to the exact details of construction as described for obvious modifications will occur to a person skilled in the art.

What is claimed is:

1. A solid state electrolyte for use in a high temperature rechargeable lithium electrochemical cell, said electrolyte having the formula $Li_{3.6}Ge_{0.6}V_{0.4}O_4$.

2. A high temperature rechargeable solid state electrochemical cell including a chemical compound of the group consisting of $TiS_2$, $FeS_2$, $CoS_2$, $NiS_2$, $LiCoO_2$, $LiNiO_2$, $LiMnO_2$, $MnO_2$, $V_6O_{13}$, $V_2O_5$, $MoS_3$, $NbSe_3$, $VSe_2$, $AgF$, $CuF_2$, $CuCl_2$, $CuCl$, and $NiF_2$ as the cathode, a lithium ion conducting solid solution of $Li_4GeO_4$ and $Li_3VO_4$ as the solid state electrolyte and a lithium containing compound taken from the group consisting of $LiAl$, $LiSi$, $LiB$, $LiC_6$, $LiTiS_2$ and $LiVSe_2$ as the anode.

3. A high temperature rechargeable solid state electrochemical cell including $LiAl$ as the anode, $TiS_2$ as the cathode, and $Li_{3.5}Ge_{0.6}V_{0.4}O_4$ as the electrolyte.

* * * * *